(12) United States Patent
Zhilin et al.

(10) Patent No.: US 12,396,064 B2
(45) Date of Patent: Aug. 19, 2025

(54) UNIVERSAL MULTI-MODE UNDERWATER SOFTWARE DEFINED MODEM

(71) Applicant: Technology Innovation Institute—Sole Proprietorship LLC, Masdar (AE)

(72) Inventors: Igor V. Zhilin, Abu Dhabi (AE); Osama M. Bushnaq, Abu Dhabi (AE); Giulia De Masi, Abu Dhabi (AE); Enrico Natalizio, Dubai (AE); Ian F. Akyildiz, Atlanta, GA (US); Najwa Aaraj, Abu Dhabi (AE)

(73) Assignee: Technology Innovation Institute—Sole Proprietorship LLC, Masdar (AE)

(*) Notice: Subject to any disclaimer, the term of this patent is extended or adjusted under 35 U.S.C. 154(b) by 336 days.

(21) Appl. No.: 17/931,816

(22) Filed: Sep. 13, 2022

(65) Prior Publication Data

US 2024/0090080 A1     Mar. 14, 2024

(51) Int. Cl.
*H04W 88/06* (2009.01)
*H04M 11/06* (2006.01)

(52) U.S. Cl.
CPC ........... *H04W 88/06* (2013.01); *H04M 11/06* (2013.01)

(58) Field of Classification Search
CPC ..... H04M 11/06; H04M 11/066; H04W 88/06
See application file for complete search history.

(56) References Cited

U.S. PATENT DOCUMENTS

| | | | |
|---|---|---|---|
| 9,853,742 B1 | 12/2017 | Radosevic et al. | |
| 2006/0052124 A1 | 3/2006 | Pottenger et al. | |
| 2008/0242239 A1* | 10/2008 | Wilson | H04B 1/52 |
| | | | 455/83 |
| 2016/0262113 A1 | 9/2016 | Diamond et al. | |
| 2018/0145771 A1* | 5/2018 | Melodia | H04B 11/00 |

FOREIGN PATENT DOCUMENTS

| | | |
|---|---|---|
| EP | 1978645 A2 | 10/2008 |
| WO | 2018075984 A1 | 4/2018 |

OTHER PUBLICATIONS

I. Zhilin, O. Bushnaq, G. D. Masi, E. Natalizio and I. F. Akyildiz, "A Universal Multimode (Acoustic, Magnetic Induction, Optical, RF) Software Defined radio Architecture for Underwater Communication," WUWNet'21, Nov. 23-26, 2021, Shenzhen, Gu (Year: 2021).*

(Continued)

*Primary Examiner* — Nader Bolourchi
(74) *Attorney, Agent, or Firm* — DLA PIPER LLP (US)

(57) ABSTRACT

A software-defined modem includes a multi-mode head and a baseband unit. The multi-mode head includes a plurality of mode frontends including, but not limited to acoustic, magnetic induction, radio frequency and optical. Each mode frontend of the plurality of mode frontends is configured to transmit and/or receive communications according to a preset communication mode. The baseband unit is configured to control operation of the multi-mode head. The multi-mode head is configured to simultaneously use one or more communication modes.

20 Claims, 10 Drawing Sheets

(56) References Cited

OTHER PUBLICATIONS

I. V. Zhilin, O. M. Bushnaq, G. D. Masi, E. Natalizio and I. F. Akyildiz, "A Universal Multimode (Acoustic, Magnetic Induction, Optical, RF) Software Defined Modem Architecture for Underwater Communication," in IEEE Transactions on Wireless Communications, vol. 22, No. 12, pp. 9105-9116, Dec. 2023 (Year: 2023).*

Demirors E., et al., "Design of A Software-defined Underwater Acoustic Modem with Real-time Physical Layer Adaptation Capabilities," In: Proceedings of the 9th International Conference on Underwater Networks Systems, Association for Computing Machinery, Nov. 12, 2014, 8 pages.

International Search Report and Written Opinion for Application No. PCT/IB2023/059092, mailed on Nov. 16, 2023, 11 pages.

Li Y., et al., "The Design and Experiment of a Software Defined Acoustic Modem for Underwater Sensor Network," Institute of Acoustics, Chinese Academy of Sciences, May 24-27, 2010, 4 pages.

Zhilin, et al., "A Universal Multimode (Acoustic, Magnetic Induction, Optical, RF) Software Defined Radio Architecture for Underwater Communication," The 15th International Conference on Underwater Networks & Systems, Nov. 2021, 4 pages.

Stojanovic, "On the relationship between capacity and distance in an underwater acoustic communication channel," Proceedings of the 1st ACM International Workshop on Underwater Networks, 2006, 10 pages.

Volkov, et al., "An Arctic-type shallow-water acoustic waveguide as an information transmission channel for underwater communications," Acoustical Physics 64.6, 2018, pp. 692-697.

Volkov, et al., "Underwater Acoustic Communications Using Vertical Receiver Arrays in Ice-Covered Shallow-Water Areas," Oceanology 61.4, 2021, pp. 569-580.

Tu, et al., "Cooperative MIMO-OFDM communications: Receiver design for Doppler-distorted underwater acoustic channels," 2010 Conference Record of the Forty Fourth Asilomar Conference on Signals, Systems and Computers, 2010, 5 pages.

Sklivanitis, et al., "Distributed mimo underwater systems: Receiver design and software-defined testbed implementation," 2016 IEEE Global Communications Conference (GLOBECOM), 2016, 7 pages.

Morel, et al., "Optical properties of the "clearest" natural waters," The American Society of Limnology and oceanography 52.1, 2007, pp. 217-229.

Sonardyne, "Bluecomm 200 UV—optical communications system," 2021.

Hydromea, "LUMA—high-speed, long range wireless optical modem," 2021.

Wang, et al., "100 m/500 Mbps underwater optical wireless communication using an NRZ-OOK modulated 520 nm laser diode," Optical Society of America 27.9, Apr. 2019, 11 pages.

Chen, et al., "26 m/5.5 Gbps air-water optical wireless communication based on an OFDM-modulated 520-nm laser diode," Optical Society of America 25.13, Jun. 2017, 6 pages.

Domingo, "Magnetic induction for underwater wireless communication networks," IEEE transactions on antennas and propagation 60.6, 2012, pp. 2929-2939.

Akyildiz, et al., "SoftWater: Software-defined networking for next-generation underwater communication systems," Ad Hoc Networks 46, 2016, 11 pages.

Campagnaro, et al., "Wireless remote control for underwater vehicles," Journal of Marine Science and Engineering 8.10, Aug. 2020, 32 pages.

Campagnaro, et al., "Multimodal underwater networks: Recent advances and a look ahead," Association for Computing Machinery, Proceedings of the International Conference on Underwater Networks & Systems, Nov. 2017, 8 pages.

Vasilescu, et al., "Data collection, storage, and retrieval with an underwater sensor network," Association for Computing Machinery, Proceedings of the 3rd international conference on Embedded networked sensor systems, 2005, pp. 154-165.

Signori, et al., "Data gathering from a multimodal dense underwater acoustic sensor network deployed in shallow fresh water scenarios," Journal of Sensor and Actuator Networks 8.4, Sep. 2019, 28 pages.

Basagni, et al., "Finding Marlin: Exploiting multi-modal communications for reliable and low-latency underwater networking," IEEE INFOCOM 2017—IEEE Conference on Computer Communications, 2017, 9 pages.

Diamant, et al., "Fair and throughput-optimal routing in multimodal underwater networks," IEEE Transactions on Wireless Communications 17.3, Nov. 2016, 30 pages.

Hu, et al., "Murao: A multi-level routing protocol for acoustic-optical hybrid underwater wireless sensor networks," 2012 9th Annual IEEE Communications Society Conference on Sensor, Mesh and Ad Hoc Communications and Networks (SECON), 2012, pp. 218-226.

Li, et al., "Underwater cooperative MIMO communications using hybrid acoustic and magnetic induction technique," Computer Networks 173, Oct. 2019, 24 pages.

Akyildiz, et al., "Realizing underwater communication through magnetic induction," IEEE Communications Magazine 53.11, Nov. 2015, pp. 42-48.

Campagnaro, et al., "Implementation of a multi-modal acoustic-optical underwater network protocol stack," Oceans 2016—Shanghai, IEEE, 2016, 6 pages.

Johnson, "The underwater optical channel," Dept. Eng., Univ. Warwick, Coventry, UK, Tech. Rep, Feb. 2012, 18 pages.

Kaushal, et al., "Underwater optical wireless communication," IEEE access 4, 2016, pp. 1518-1547.

Office Action and Search Report for United Arab Emirates Patent Application No. P6002300/2023, dated May 14, 2025, 10 pages.

* cited by examiner

UNIVERSAL MULTI-MODE UNDERWATER SOFTWARE DEFINED MODEM

FIELD OF DISCLOSURE

The present disclosure generally relates to a universal multi-mode underwater software defined modem and a method for operating the same.

BACKGROUND

Underwater acoustic communication is the most popular physical layer technology due to its reliable and long range communication, which can exceed several kilometers. However, acoustic communication has high propagation delays due to the low speed of sound in water. Furthermore, long-range acoustic propagation is efficient over a limited spectral bandwidth, thus limiting the channel capacity even when advanced technologies, such as multiple input multiple output (MIMO) are used. Wide bandwidth acoustics may be capable of achieving data rates of 1 Mbps for distances up to 100 m. This makes acoustic communication the preferred mechanism in underwater applications compared to other forms of communication, such as magnetic induction and optical communication in terms of capacity. However, propagation delay in acoustic communication may still be limited by the speed of sound.

Alternatively, optical communication has high propagation speed $$\left(e.g., 225 \ \frac{m}{\mu s}\right)$$

and ultimately wide bandwidth (e.g., hundreds of THz). However, optical waves may suffer from high absorption and scattering depending on the water characteristics, which may limit achievable transmission range to ≈500 m in the most transparent ocean waters and to ≈10 m and below in turbulent water. Practical implementations of optical communication systems have achieved up to 10 Mbps at 150 m using wide-beam LED modems. Higher data rates, such as 500 Mbps at 100 m and 5.5 Gbps at 26 m may be achieved using collimated laser beam in a lab environment.

Radio frequency (RF) communication is another transmission mode that can maintain a short-range signal propagation and can provide high data rates. Since electromagnetic waves in water may be absorbed at distance of order of the wavelength, electromagnetic waves may not be used at close contact, or at very low frequencies, which may lead to giant antenna sizes and very low data rates. Finally, magnetic induction may provide reliable short-range communications depending on water conductivity with high propagation speeds at ≈33 m/μs. As those skilled in the art understand, one transmission mode can be preferred over the others, depending on the transmission requirements, water types/characteristics, and/or transmission range.

Conventional approaches to the above limitations involve multi-mode underwater communication systems with multiple frontends to meet the different communication quality of service requirements. Such conventional approaches simply use dual separate modems with acoustic communication to maintain low-bandwidth control signaling, and optical or magnetic induction communication for high-speed data off-load, when the nodes are close to each other.

SUMMARY

In some embodiments, a software-defined modem is disclosed herein. The software-defined modem includes a multi-mode head and a baseband unit. The multi-mode head includes a plurality of mode frontends. Each mode frontend of the plurality of mode frontends is configured to transmit and receive communications according to a preset communication mode. The baseband unit is configured to control operation of the multi-mode head. The multi-mode head is configured to simultaneously use two or more communication modes.

In some embodiments, a software-defined modem is disclosed herein. The software-defined modem includes a multi-mode head and a baseband unit. The multi-mode head includes a first mode frontend and a second mode frontend. The first mode frontend is configured to transmit and receive communications according to a first communication mode. The second mode frontend is configured to transmit and receive communications according to a second communication mode. The baseband unit is configured to control operation of the multi-mode head. The multi-mode head is configured to simultaneously use the first communication mode and the second communication mode. The baseband unit is configured to select one of the first communication mode or the second communication mode for communicating with a node by probing the first communication mode and the second communication mode and establishing a first communication link with the node via the first communication mode and a second communication link with the node via the second communication mode, receiving a first set of transmissions via the first communication mode and a second set of transmissions via the second communication mode, determining that the first communication mode results in a lower hardware resource load on the software-defined modem, and, responsive to the determining, sending data to the node using the first communication mode.

In some embodiments, a method of operating a software-defined modem configured to simultaneously use two or more communication modes is disclosed herein. The method includes probing a first communication mode of the software-defined modem and a second communication mode of the software-defined modem. The method further includes establishing a first communication link with a target node via the first communication mode and a second communication link with the target node via the second communication mode. The method further includes receiving a first set of transmissions via the first communication mode and a second set of transmissions via the second communication mode. The method further includes determining that the first communication mode results in a lower hardware resource load on the software-defined modem. The method further includes, responsive to the determining, sending data to the target node using the first communication mode.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Conventional approaches to multi-mode underwater communication systems may employ multiple frontends to meet the different levels of quality of service required for the communication. Such conventional approaches simply use separate modems with acoustic communication to maintain low-bandwidth control signaling, and optical or magnetic induction communication for high-speed data offload, when the nodes are close to each other. While these conventional approaches may operate over several modes simultaneously by utilizing several independent transceivers, such approaches typically suffer from several limitations. First, the transceiver separation may add internal routing delays. Second, the processing may be limited to standard packet reception and transmission. For example, amplify-and-forward techniques cannot be implemented without low-level interconnection between the modes that will allow to pass non-processed signal from one mode to another. Third, inter-mode co-operative operation is often difficult, since it requires precise synchronization.

One or more techniques disclosed herein provide a universal software-defined modem architecture that integrates multi-mode device operation. Realization of the universal software-defined modem architecture can significantly improve system performance by allowing simplified communication between different communication modes, improve synchronization accuracy, and reduce modem cost and size. The universal software-defined modem architecture disclosed herein may enable joint operation of multiple modes at the same time. For example, the universal software-defined modem architecture may include a physical layer that may combine functions of the separate modes, as well as synchronization and signal processing. In this manner, the universal software-defined modem architecture may be able to support any physical frontend or several frontends simultaneously.

In some embodiments, such universal software-defined modem may be utilized in one or more underwater communications environments. For example, the universal software-defined modem described herein may be used in underwater applications to wirelessly transmit data to surface nodes and sub-surface nodes. For example, using the universal software-defined modem, a surface user may communicate with a sub-surface user (e.g., a user in an underwater vehicle).

Figure 1:
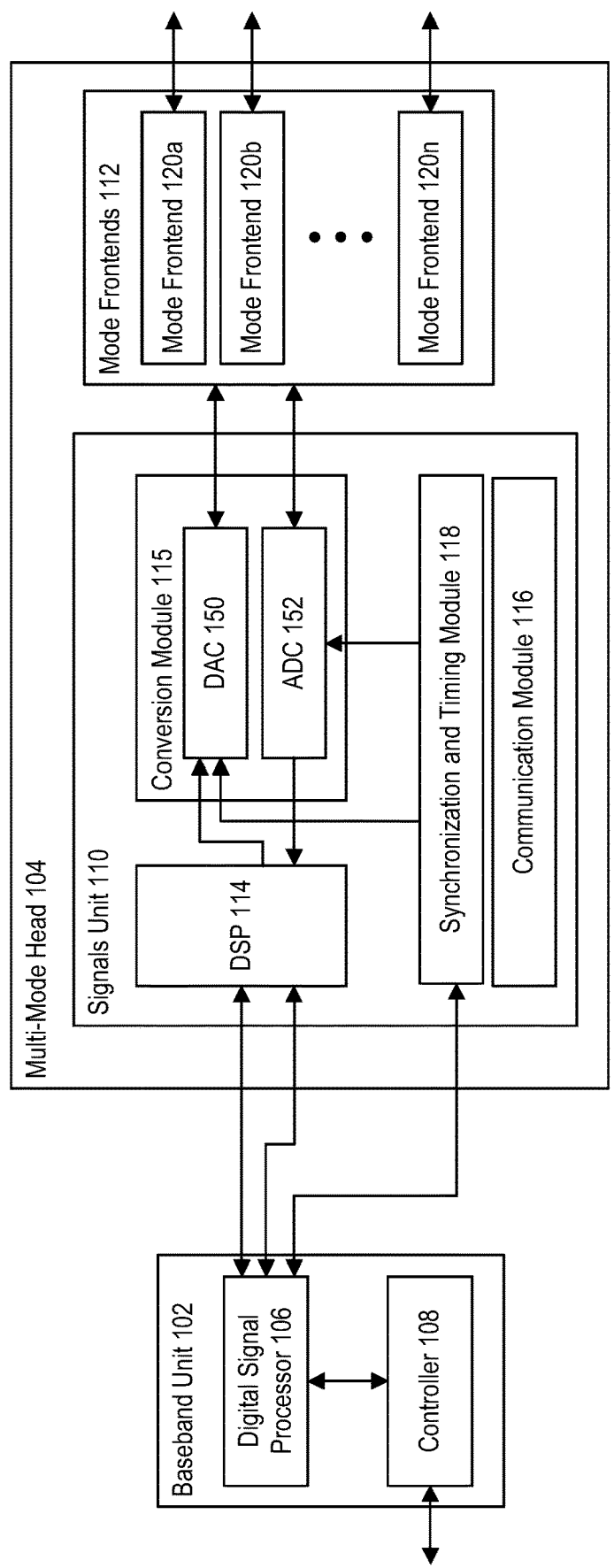
FIG. 1 is a block diagram illustrating an architecture of a universal multi-mode software defined modem, according to example embodiments.

FIG. 1 is a block diagram illustrating an architecture of a universal multi-mode software defined modem ("UniSDM device") 100, according to example embodiments. As shown, UniSDM device 100 may include a baseband unit 102 and a multi-mode head 104. In some embodiments, UniSDM device 100 may include more than one multi-mode head 104. However, for ease of discussion and illustration, only one multi-mode head 104 is shown. In some embodiments, baseband unit 102 and multi-mode head 104 may operate as a single unit. In some embodiments, baseband unit 102 and multi-mode head 104 may be distributed and connected, similar to cloud radio access networks of modern terrestrial mobile networks. In some embodiments, the connection interface may provide functionality similar to the Common Public Radio Interface (CPRI™), but may account for network modality, i.e., provide access to various physical modes with different properties.

Baseband unit 102 may be configured to control UniSDM device 100. For example, as shown, baseband unit 102 may include a controller 106 and a digital signal processor 108. Controller 106 may be configured to interface with a user. For example, as discussed above in conjunction with FIG. 1, a user or user device may communicate with UniSDM device 100. Controller 106 may act as the interface between the user or user device (e.g., client device 702 in FIG. 7) and UniSDM device 100. In some embodiments, controller 106 may be configured to control one or more subsystems of UniSDM device 100. For example, controller 106 can load different modules (e.g., PHY layer functions (e.g., modulation and coding schemes), higher-layer communication protocols (e.g., medium access control, routing, transport layer), network management and control solutions) to digital signal processor 108 or digital signal processor 114, activate or deactivate these modules to decrease the power consumption. The controller 106 can decide which modules to load based on scenarios.

Digital signal processor 108 may be configured to implement one or more processes or algorithms of UniSDM device 100. For example, digital signal processor 108 may be configured to implement one or more protocols from high medium access control (high-MAC) to high physical layer (high-PHY). For example, DSP 108 may implement some existing standardized protocols for acoustic communication, e.g. JANUS by NATO Europe, or terrestrial standards, e.g. 4G (LTE; Long-Term Evolution) and 5G, as well as other standards such as Wi-Fi, Bluetooth, ZigBee, etc. In operation, data may flow from controller 106 through digital signal processor 108 and to multi-mode head 104. Similarly, data may flow in the opposite direction, i.e., from multi-mode head 104 to digital signal processor 108 and to controller 106.

Multi-mode head 104 may be configured to provide baseband unit 102 with access to various wired or wireless communication modes of UniSDM device 100. As shown, baseband unit 102 may include a signals unit 110 and two or more mode frontends 112.

Signals unit 110 may be configured to communicate with controller 106. For example, signals unit 110 may be configured to forward control signals from controller 106 to mode frontends 112. Signals unit 110 may include a digital signal processor 114, conversion module 115, a communications module 116, and a synchronization and timing module 118. Each of digital signal processor 114, conversion module 115, communications module 116, and synchronization and timing module 118 may be comprised of one or more software modules and/or one or more hardware modules. The one or more software modules are collections of code or instructions stored on a media (e.g., memory) that represent a series of machine instructions (e.g., program code) that implements one or more algorithmic steps. Such machine instructions may be the actual computer code the processor interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Digital signal processor 114 may be configured to perform one or more digital signal operations. For example, digital signal processor 114 may be configured to filter the digital signal provided by baseband unit 102, may execute algorithms for Peak-to-Average Power Ratio reduction and gain control as well as may perform frequency conversion.

Conversion module 115 may be configured to perform an analog-to-digital and/or a digital-to-analog conversion. In some embodiments, conversion module 115 may include a digital-to-analog converter (e.g., DAC 150) configured to convert an electrical signal to an analog signal before the signal is transmitted through a selected mode frontend 112. In some embodiments, conversion module 115 may include an analog-to-digital converter (e.g., ADC 152) configured to convert a received analog signal to a digital signal before the digital signal is processed by signals unit 110 and baseband unit 102.

Communications module 116 may be configured to generate and communicate control signals. For example, along with control signals generated by baseband unit 102, communications module 116 may also be configured to generate and communicate control signals at signals unit 110. In some embodiments, communications module 116 may generate control signals that may include information on the selected mode frontend 112.

Synchronization and timing module 118 may be configured to manage modulation and coding schemes that may use more than one mode frontend 112, including MIMO and multi-mode cooperative MIMO. In some embodiments, synchronization and timing module 118 may be representative of high-precision clocking circuitry configured to provide reference signals for mode frontends 112 when needed. In some embodiments, synchronization and timing module 118 may exchange synchronization signals with baseband unit 102. In some embodiments, synchronization and timing module 118 may exchange synchronization signals with external devices, such as external Global Navigation Satellite Systems (GNSS) receivers.

Mode frontends 112 may be configured to transmit and receive communications according to a preset communication mode. For example, as shown, mode frontends 112 may include a first mode frontend 120*a* and a second mode frontend 120*b*. Generally, mode frontends 112 may include n mode frontends (e.g., mode frontend 120*n*). Mode frontend 120*a* may be configured to transmit and receive communications according to a first communication mode. Exemplary first communication modes may include, but are not limited to, radio frequency communication, magnetic induction communication, acoustic communication, optical communication, and wired communication. Mode frontend 120*b* may be configured to transmit and receive communications according to a second communication mode. Exemplary second communication modes may include, but are not limited to, radio frequency communication, magnetic induction communication, acoustic communication, optical communication, and wired communication. As those skilled in the art understand, although only two mode frontends 120*a*, 120*b* are illustrated, multi-mode head 104 may include more than two mode frontends. By providing multiple mode frontends 112, UniSDM device 100 may support multi-mode operation, i.e., more than one type of communication mode, with their specifications.

In some embodiments, multiple mode frontends 112 may allow UniSDM device 100 to support MIMO operations. Such MIMO operations can be implemented in a variety of ways. In some embodiments, mode frontends 112 may include multiple receiver and/or transmitter channels. For example, a given mode frontend 112 can provide four receiver/transmitter channels. In some embodiments, UniSDM device 100 may include several identical frontends 112. For example, UniSDM device 100 may include four identical 1-channel optical mode frontends. The structure of UniSDM device 100 may allow for cooperation and synchronization between multiple modes, thus it is possible to use several mode frontends together to provide MIMO operations. In some embodiments, the two foregoing approaches may be used together. For example, a UniSDM device 100 may include two mode frontends, each having four channels, thus providing 8-channel operation.

Mode frontends 112 may be configured to provide three main functions: frequency up/down conversion, power level control, and signal conversions.

In some embodiments, for high frequencies (e.g., RF and beyond), the baseband signal generated by signals unit 110 must be converted to actual radio frequency. The electrical-optical conversion may be viewed as a variant of frequency conversion. For example, a transmission at a 400 nm wavelength is essentially a transmission at 750 THz carrier frequency.

In some embodiments, the electrical interface between signals unit 110 and mode frontends 112 may use standardized signal levels for the interconnection. In some embodiments, signals' power may be adjusted before being converted to another medium for transmission. Conversely, the received signals' powers may be adjusted to standardized levels before being processed at signals unit 110 and baseband unit 102. In order to match the signal power levels, the interface between signals unit 110 and mode frontends 112 may carry information on the required transmission signal power and average received signal power.

Mode frontends 112 may be configured to convert between baseband electric signals and signals in actual physical modes (e.g., RF, magnetic induction, optical signals, wired signals, etc.). Details of signal conversion may be found below in conjunction with FIGS. 2-5.

In some embodiments, UniSDM device 100 may support multiple operation modes with one or more communication technologies per mode. For example, RF mode could implement 5G technology for broadband data connectivity or long range (LoRa®) technology for low-rate data transmission. In another example, an acoustic mode can implement various communication protocols, e.g., JANUS or proprietary protocols. Depending on the required communication quality of service, and the measured channel state information for all supported modes and bands within modes, one or more nodes may be selected to conduct transmission. Due to the software-defined-modem nature of UniSDM device 100, the configuration can be remotely updated. Such functionality allows for UniSDM device 100 to support future technologies, including MIMO.

Since each technology operation may require various resources (e.g., memory for storage, Digital Signal Processing (DSP) resource for implementation, power for power activation), controller 106 may implement one or more mode selection algorithms (discussed below) that may take the resources' availability into account.

In some embodiments, UniSDM device 100 may be configurable in various states. Exemplary states may include, but are not limited to, active communication, standby (e.g., active reception mode), sleep (e.g., requiring external request to power-up), and hibernated (e.g., not loaded to DSP and needing additional time, and possibly rebooting, for enabling).

In some embodiments, UniSDM device 100 may be configured to establish a communication with another node. To establish a connection, UniSDM device 100 may be configured to decide which mode or modes it is going to use. To make that determination, controller 106 may initiate a channel probing process in which controller 106 may probe the available modes and establish a link with the other node. Once one or more links between UniSDM device 100 and the node is established, controller 106 may collect the links' channel station information to select one of the modes to perform the data transmission based on a given criteria.

In some embodiments, to probe the modes, UniSDM device 100 may send probing packets at maximum available power. When another node receives such packet, it may reply to it. During this two-way communication, each node may measure the received power and response delay, and thus obtain information about the propagation delay and the path loss. In some embodiments, the modes' probing may be done sequentially, starting from the mode that may provide the lowest delay. Such an approach may reduce the required transmission time and may minimize interference. For example, if two nodes can establish an optical mode link, they can use the optical mode link for all types of communication, both control and data. If, for example, the optical link is not available, the nodes should probe a magnetic induction mode. If, for example, neither optical nor magnetic probing succeeded, the nodes should switch to acoustic, which may provide the longest range but at the lowest speed.

In some embodiments, controller 106 may select the mode that may result in the lowest hardware load according to one or more metrics. In some embodiments, controller 106 may select the mode based on signal-to-noise ratio (SNR) threshold with higher-speed mode priority. In some embodiments, controller 106 may select the mode based on energy efficiency per distance (e.g., J/bit/m). Such selection may reduce the overall energy used by UniSDM device 100.

In some embodiments, controller 106 may select the mode based on transmit time for latency minimization and throughput maximization considering non uniform density. In some embodiments, controller 106 may select the mode based on the energy efficiency of the current node (e.g., J/bit). In some embodiments, controller 106 may select the mode based on other performance metrics such as transmit time, energy used, or the amount of the medium occupied by the transmission. In some embodiments, controller 106 may select the mode based on transmit time multiplied by the number of neighbors capable of hearing the communication for per-volume throughput maximization considering non-uniform node density.

Such mode switching for a given task stands in contrast to traditional engineering approaches that utilize separate modes for separate tasks, i.e., acoustic modem for remote control at any distance and optical model for data offload at short ranges. The present functionality provides an improvement over such systems by anticipating the medium (e.g., the water) becoming much more crowded with underwater sensors, autonomous underwater vehicles, remotely operated vehicles, and other underwater Internet-of-Things devices becoming more widespread, and accounting for that change. For example, by allowing for the automatic switching between modes (e.g., from a long-range mode to a short-range mode), UniSDM device 100 can mitigate any interference problems.

Figure 2:
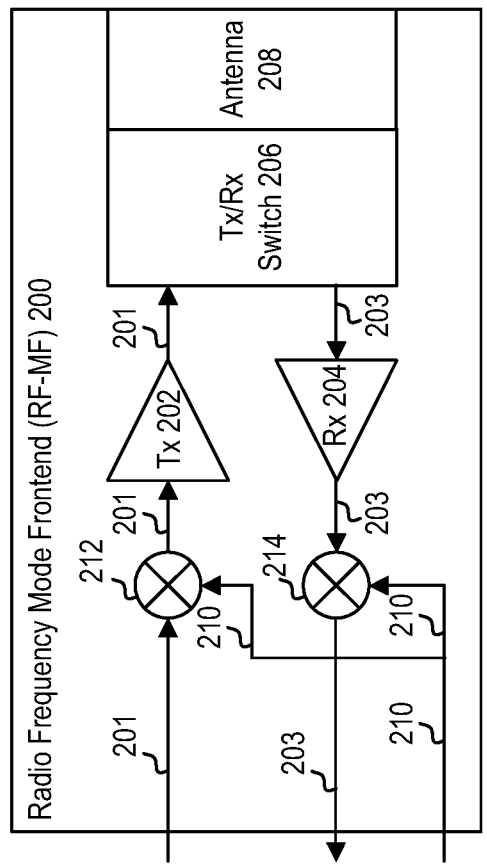
FIG. 2 is a block diagram illustrating an exemplary architecture of a radio frequency mode frontend, according to example embodiments.

FIG. 2 is a block diagram illustrating an exemplary architecture of a radio frequency mode frontend 200, according to example embodiments. In some embodiments, radio frequency mode frontend 200 may be representative of a mode frontend that may be used in UniSDM device 100. For example, radio frequency mode frontend 200 may be representative of mode frontend 112 discussed above in conjunction with FIG. 1.

As shown, radio frequency mode frontend 200 may include a transmitter 202, a receiver 204, a transmitter/receiver switch 206, and an antenna 208. Although not shown, in some embodiments, frequency mode frontend 200 may further include one or more local oscillators, mixers, filters, and amplifiers. In some embodiments, transmitter 202 may be a power amplification transmitter (e.g., Tx PA). For example, transmitter 202 may receive signal 201 from signals unit 110, amplify signal 201, and provide signal 201 to switch 206 for transmission via antenna 208. In some embodiments, receiver 204 may be a low noise amplifier receiver (e.g., Rx LNA). For example, receiver 204 may receive an incoming signal 203, via antenna 208, amplify incoming signal 203, and provide amplified incoming signal 203 to signals unit 110 for processing.

Switch 206 may be configured to toggle between a transmitter mode and a receiver mode. Accordingly, in some embodiments, switch 206 may toggle to transmitter mode to transmit an amplified signal provided by transmitter 202 via antenna 208; in some embodiments, switch 206 may toggle to receiver mode to receive an incoming signal via antenna 208 and subsequently provide the incoming signal to receiver 204.

As shown, in some embodiments, radio frequency mode frontend 200 may receive synchronization connections 210 from synchronization and timing module 118 of signals unit 110. In some embodiments, synchronization connections 210 may be used to synchronize the local oscillators of radio frequency mode frontend 200. For example, such synchronization may be used during MIMO operation, such as when multiple radio-frequency mode frontends 200 are employed. In some embodiments, synchronization connections 210 may be used to amplify the outgoing signal (e.g., shown via node 212). In some embodiments, synchronization connections 210 may be used to amplify the incoming signal (e.g., shown via node 214).

Figure 3:
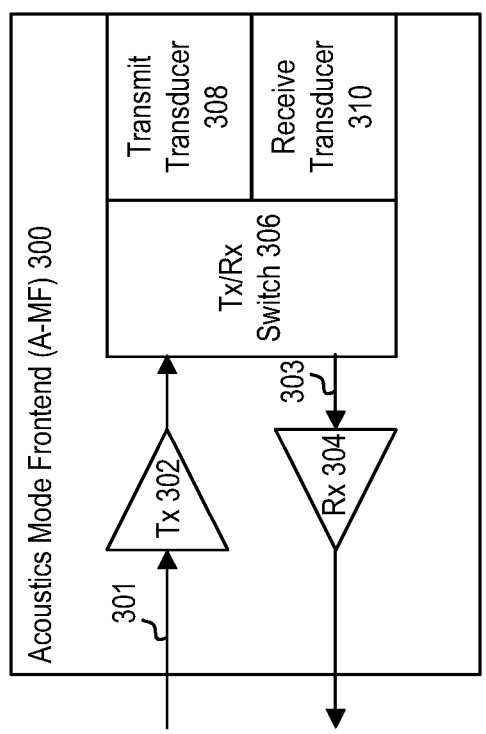
FIG. 3 is a block diagram illustrating an exemplary architecture of an acoustics mode frontend, according to example embodiments.

FIG. 3 is a block diagram illustrating an exemplary architecture of an acoustics mode frontend 300, according to example embodiments. In some embodiments, acoustics mode frontend 300 may be representative of a mode frontend that may be used in UniSDM device 100. For example, acoustics mode frontend 300 may be representative of the mode frontend 112 discussed above in conjunction with FIG. 1.

As shown, acoustics mode frontend 300 may include a transmitter 302, a receiver 304, a transmitter/receiver switch ("switch") 306, a transmit transducer 308, and a receive transducer 310 (e.g., hydrophone). In some embodiments, transmitter 302 may be a power amplification transmitter (e.g., Tx PA). For example, transmitter 302 may receive a signal 301 from signals unit 110, amplify signal 301, and provide signal 301 to switch 306 for transmission via transmit transducer 308. In some embodiments, receiver 304 may be a low noise amplifier receiver (e.g., Rx LNA). For example, receiver 304 may receive an incoming signal 303, via receive transducer 310, amplify incoming signal 303, and provide amplified incoming signal 303 to signals unit 110 for processing.

Acoustics mode frontend 300 may be configured to operate in a wide array of varying frequencies. Generally, acoustics transmission frequencies are low compared to radio frequencies, thus additional frequency conversion may not be needed. In some embodiments, depending on the frequencies and dynamic range requirements, receive transducer 310 and transmit transducer 308 may be combined or separated.

Figure 4:
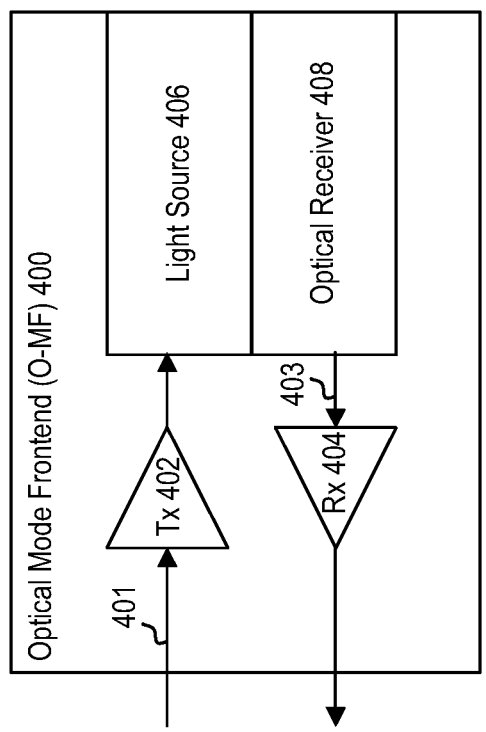
FIG. 4 is a block diagram illustrating an exemplary architecture of an optical mode frontend, according to example embodiments.

FIG. 4 is a block diagram illustrating an exemplary architecture of an optical mode frontend 400, according to example embodiments. In some embodiments, optical mode frontend 400 may be representative of a mode frontend that may be used in UniSDM device 100. For example, optical mode frontend 400 may be representative of a mode frontend 112 discussed above in conjunction with FIG. 1.

As shown, optical mode frontend 400 may include a transmitter 402, a receiver 404, a light source 406, and an optical receiver 408. Transmitter 402 may receive signal 401 from signals unit 110 and may provide signal 401 to light source 406 for transmission. In some embodiments, receiver 404 may receive an incoming signal 403, via optical receiver 408, and may provide incoming signal 403 to signals unit 110 for processing.

In some embodiments, light source 406 may be representative of a light emitting device, such as LEDs or LASERS. In some embodiments, optical receiver 408 may be implemented by p-i-n photodiodes, avalanche photodiodes, photomultiplier tubes, or other photo-detector types. Controller 106 may be interested in the properties of the received transmission. Example properties may include, but are not limited to, transmission power, modulation bandwidth, carrier frequency (e.g., wavelength), directivity, and noise per performance (e.g., amplitude noise, and phase noise for coherent modulators. Because optical properties of water vary with the water type, UniSDM device 100 may implement various wavelengths. For example, UniSDM device 100 may implement around violet-blue (e.g., 410 nm) for clear water, or around 520 nm for shallow sea and coastal lines waters. In some embodiments, these modes may be used in wavelength-division multiplexing approach, increasing the available bandwidth. For example, multi-mode head 104 may implement several modes with different wavelengths, e.g., 400 nm, 450 nm and 520 nm. It may use all modes simultaneously and may triple the throughput accordingly. Note that a single mode (e.g., 400 nm) between any two nodes A and B and another mode (e.g., 450 nm) between A and C may be used simultaneously by multi-mode head 104. Note also that different modes may be used for bi-directional communication, e.g. one mode from A to B and another one from B to A.

Figure 5:
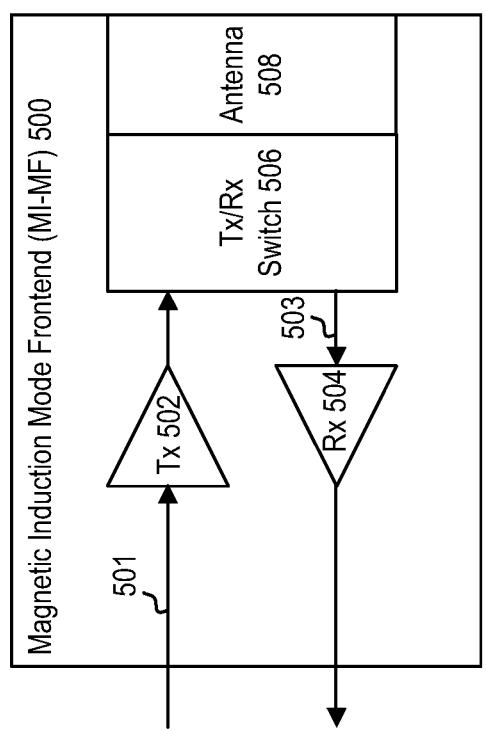
FIG. 5 is a block diagram illustrating an exemplary architecture of a magnetic induction mode frontend, according to example embodiments.

FIG. 5 is a block diagram illustrating an exemplary architecture of a magnetic induction mode frontend 500, according to example embodiments. In some embodiments, magnetic induction mode frontend 500 may be representative of a mode frontend that may be used in UniSDM device 100. For example, magnetic induction mode frontend 500 may be representative of a mode frontend 112 discussed above in conjunction with FIG. 1.

As shown, magnetic induction mode frontend 500 may include a transmitter 502, a receiver 504, a transmitter/receiver switch ("switch") 506, and an antenna 508. In some embodiments, transmitter 502 may be a power amplification transmitter (e.g., Tx PA). For example, transmitter 502 may receive a signal 501 from signals unit 110, amplify signal 501, and provide signal 501 to switch 506 for transmission via antenna 508. In some embodiments, receiver 504 may be a low noise amplifier receiver (e.g., Rx LNA). For example, receiver 504 may receive an incoming signal 503, via antenna 508, amplify incoming signal 503, and provide amplified incoming signal 503 to signals unit 110 for processing.

Switch 506 may be configured to toggle between a transmitter mode and a receiver mode. Accordingly, in some embodiments, switch 506 may toggle to transmitter mode to transmit an amplified signal provided by transmitter 502 via antenna 508; in some embodiments, switch 506 may toggle to receiver mode to receive an incoming signal via antenna 508 and subsequently provide the incoming signal to receiver 504. Antenna 508 may be representative of a magnetic antenna. For example, antenna 508 may be representative of one or more three-axis antennas for omni-direction transmission and reception.

Figure 6A:
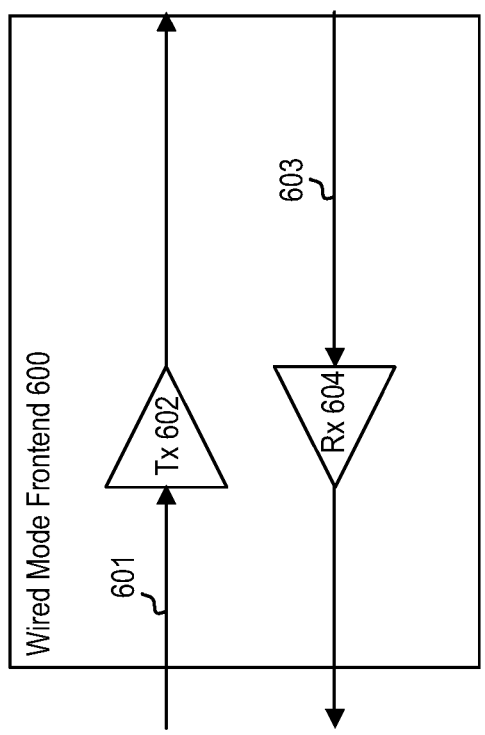
FIG. 6A is a block diagram illustrating an exemplary architecture of a wired mode frontend, according to example embodiments.

FIG. 6A is a block diagram illustrating an exemplary architecture of a wired mode frontend 600, according to example embodiments. In some embodiments, wired mode frontend 600 may be representative of a mode frontend that may be used in UniSDM device 100. For example, wired mode frontend 600 may be representative of a mode frontend 112 discussed above in conjunction with FIG. 1.

As shown, wired mode frontend 600 may be representative of a copper cable wired mode front end. Wired mode frontend 600 may include a transmitter 602 and a receiver 604. In some embodiments, transmitter 602 may be a power amplification transmitter (e.g., Tx PA). For example, transmitter 602 may receive a signal 601 from signals unit 110, amplify signal 601, and may transmit the signal. In some embodiments, receiver 604 may be a low noise amplifier receiver (e.g., Rx LNA). For example, receiver 604 may receive an incoming signal 603, may amplify incoming signal 603, and provide amplified incoming signal 603 to signals unit 110 for processing.

Figure 6B:
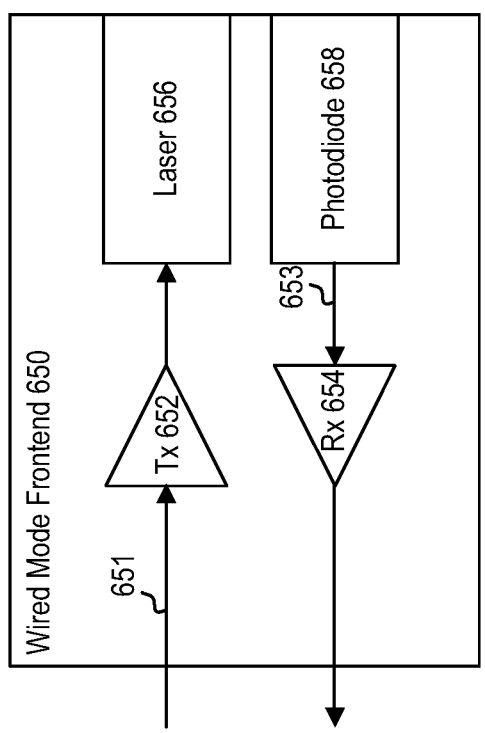
FIG. 6B is a block diagram illustrating an exemplary architecture of a wired mode frontend, according to example embodiments.

FIG. 6B is a block diagram illustrating an exemplary architecture of a wired mode frontend 650, according to example embodiments. In some embodiments, wired mode frontend 650 may be representative of a mode frontend that may be used in UniSDM device 100. For example, wired mode frontend 650 may be representative of a mode frontend 112 discussed above in conjunction with FIG. 1.

As shown, wired mode frontend 650 may be representative of a fibre optic wired mode front end. Wired mode frontend 650 may include a transmitter 652, a receiver 654, a laser 656, and a photodiode 658. In some embodiments, transmitter 652 may be a power amplification transmitter (e.g., Tx PA). For example, transmitter 652 may receive a signal 651 from signals unit 110, amplify signal 651, and may transmit signal 651, via laser 656. In some embodiments, receiver 654 may be a low noise amplifier receiver (e.g., Rx LNA). For example, receiver 654 may receive an incoming signal 653, via photodiode 658, may amplify incoming signal 653, and provide amplified incoming signal 653 to signals unit 110 for processing.

Figure 7:
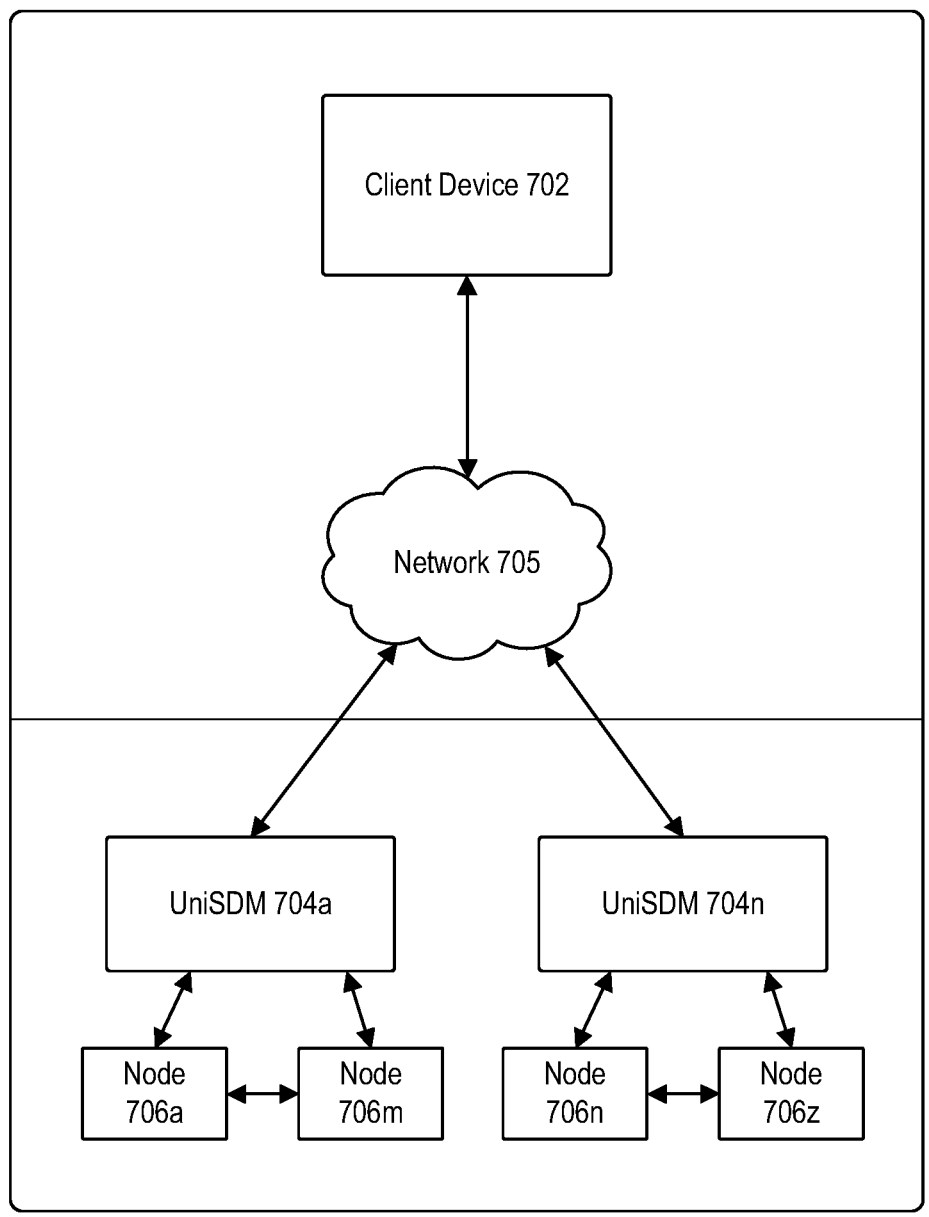
FIG. 7 is a block diagram illustrating an exemplary computing environment, according to example embodiments.

FIG. 7 is a block diagram illustrating an exemplary computing environment 700, according to example embodiments. Computing environment 700 may include at least one or more user devices 702 and one or more UniSDMs (e.g., UniSDM device 704a, UniSDM device 704n) communicating via network 705.

Network 705 may be of any suitable type, including individual connections via the Internet, such as cellular or Wi-Fi networks. In some embodiments, network 705 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 705 may include any type of computer networking arrangement used to exchange data. For example, network 705 may be the Internet, a private data network, virtual private network using a public network and/or other suitable connection(s) that enables components in computing environment 700 to send and receive information between the components of computing environment 700.

User device 702 may be operated by a user. User device 702 may be representative of a mobile device, a tablet, a desktop computer, or any computing system having the capabilities described herein. In some embodiments, user device 702 may be configured to remotely update software of UniSDM 704a or UniSDM 604n. Such remote updating allows UniSDM 704a and UniSDM 704n to support future or new technologies, such as MIMO. In some embodiments, user device 702 may be configured to send and/or receive one or more digital signals to UniSDM 704a and/or UniSDM 704n via network 705.

As shown, user device 702 may communicate with UniSDM 704a and UniSDM 704n. Although two UniSDMs are illustrated in FIG. 7, those skilled in the art understand that client device 702 may communicate with a plurality UniSDM devices. UniSDM 704a and UniSDM 704n may be representative of UniSDM device 100 discussed above in conjunction with FIG. 1. In operation, UniSDM 704a may receive a signal from client device 702. UniSDM device 704a may process and send the signal to one or more nodes 706a-706m. Exemplary nodes 706a-706m may include, but are not limited to, underwater sensors, autonomous underwater vehicles, remotely operated vehicles, and other underwater Internet-of-Things devices. Similarly, UniSDM device 704n may process and send the signal to one or more nodes 706n-706z. Exemplary nodes 706n-706z may include, but are not limited to, underwater sensors, autonomous underwater vehicles, remotely operated vehicles, and other underwater Internet-of-Things devices.

Figure 8:
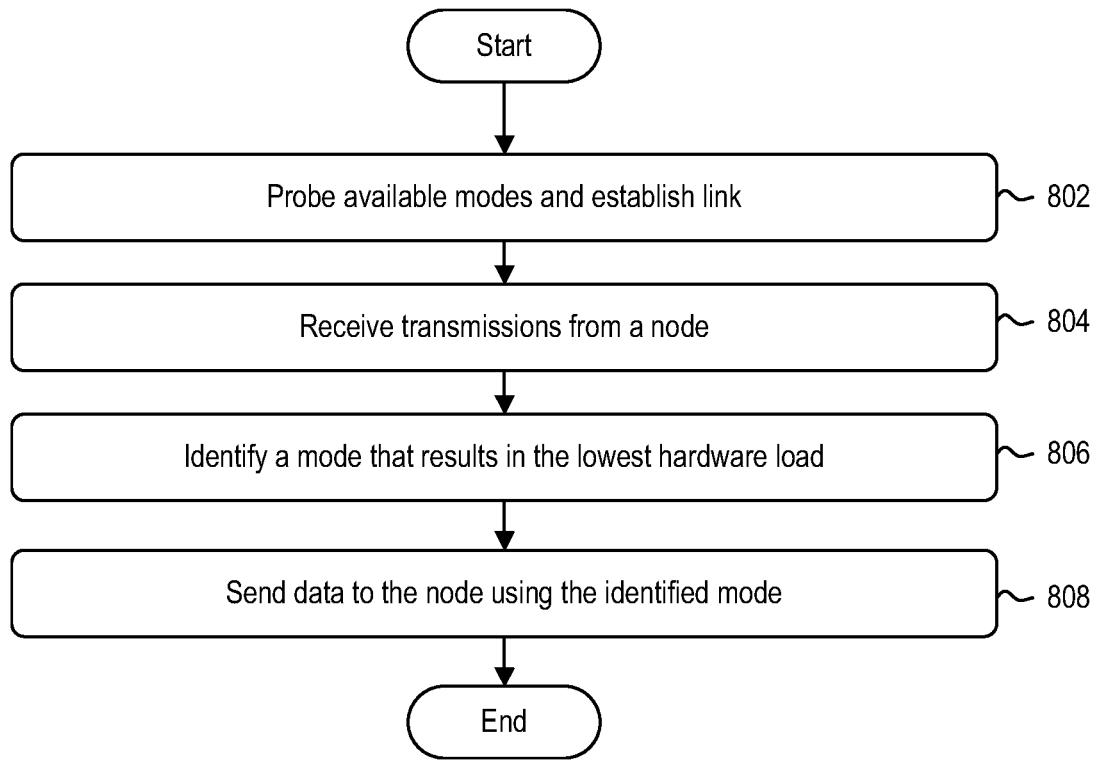
FIG. 8 is a flow diagram illustrating a method of operating a universal multi-mode software defined modem, according to example embodiments.

FIG. 8 is a flow diagram illustrating method 800 of operating a universal multi-mode software defined modem (e.g., UniSDM device 100), according to example embodiments. Method 800 may begin at step 802.

At step 802, controller 106 on UniSDM device 100 may initiate a channel probing process in which controller 106 may probe the available modes and establish a link with the other node. Controller 106 may establish one or more links between UniSDM device 100 and the other node. In some embodiments, to probe the modes, UniSDM device 100 may send probing packets at maximum available power to the other node. When the other node receives such packet, it may reply to it. During this two-way communication, each node may measure the received power and response delay, and thus obtain information about the propagation delay and the path loss. In some embodiments, the modes probing may be done sequentially, starting from the mode that may provide the lowest delay. Such an approach may reduce the required transmission time and may minimize interference. For example, if two nodes can establish an optical mode link, they can use the optical mode link for all types of communication, both control and data. If, for example, the optical link is not available, the nodes should probe a magnetic induction mode. If, for example, neither optical nor magnetic probing succeeded, the nodes should switch to acoustic, which may provide the highest range but at the lowest speed.

At step 804, UniSDM device 100 may receive transmissions from the node over the established links. For example, controller 106 may collect the links' channel station information to select one of the modes to perform the data transmission based on a given criteria.

At step 806, UniSDM device 100 may select the mode that may result in the lowest hardware load according to one or more metrics. In some embodiments, controller 106 may select the mode based on SNR threshold with higher-speed mode priority. In some embodiments, controller 106 may select the mode based on energy efficiency per distance (e.g., J/bit/m). Such selection may reduce the overall energy used by UniSDM device 100. In some embodiments, controller 106 may select the mode based on transmit time for latency minimization and throughput maximization considering non uniform density. In some embodiments, controller 106 may select the mode based on the energy efficiency of the current node (e.g., J/bit). In some embodiments, controller 106 may select the mode based on other performance metrics such as transmit time, energy used, or the amount of the medium occupied by the transmission. In some embodiments, controller 106 may select the mode based on transmit time multiplied by the number of neighbors capable of hearing the communication for per-volume throughput maximization considering non-uniform node density.

At step 808, UniSDM device 100 may send data to the node using the identified mode. For example, based on the determined mode in step 806, UniSDM device 100 may configure a signal to be transmitted to the other node using the identified mode.

Figure 9A:
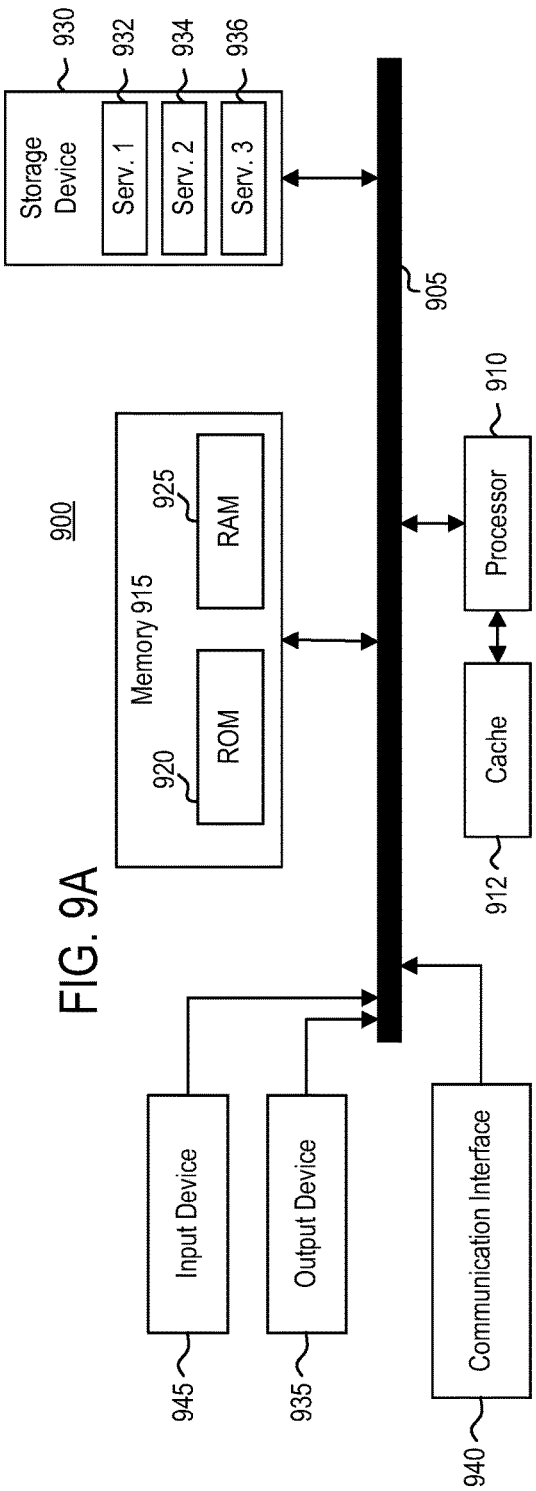
FIG. 9A is a block diagram illustrating a computing device, according to example embodiments.

FIG. 9A illustrates a system bus architecture of computing system 900, according to example embodiments. System 900 may be representative of at least a portion of baseband unit 102 and/or multi-mode head 104. One or more components of system 900 may be in electrical communication with each other using a bus 905. System 900 may include a processing unit (CPU or processor) 910 and a system bus 905 that couples various system components including the system memory 915, such as read only memory (ROM) 920 and random access memory (RAM) 925, to processor 910. System 900 may include a cache of high-speed memory connected directly with, in close proximity to, or integrated as part of processor 910. System 900 may copy data from memory 915 and/or storage device 930 to cache 912 for quick access by processor 910. In this way, cache 912 may provide a performance boost that avoids processor 910 delays while waiting for data. These and other modules may control or be configured to control processor 910 to perform various actions. Another system memory 915 may be available for use as well. Memory 915 may include multiple different types of memory with different performance characteristics. Processor 910 may include any general purpose processor and a hardware module or software module, such as service 1 932, service 2 934, and service 3 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction with the computing system 900, an input device 945 may represent any number of input mechanisms, such as a microphone for speech, a touch-sensitive screen for gesture or graphical input, keyboard, mouse, motion input, speech and so forth. An output device 935 may also be one or more of a number of output mechanisms known to those of skill in the art. In some instances, multi-mode systems may enable a user to provide multiple types of input to communicate with computing system 900. Communications interface 940 may generally govern and manage the user input and system output. There is no restriction on operating on any particular hardware arrangement and therefore the basic features here may easily be substituted for improved hardware or firmware arrangements as they are developed.

Storage device 930 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 925, read only memory (ROM) 920, and hybrids thereof.

Storage device 930 may include services 932, 934, and 936 for controlling the processor 910. Other hardware or software modules are contemplated. Storage device 930 may be connected to system bus 905. In one aspect, a hardware module that performs a particular function may include the software component stored in a computer-readable medium in connection with the necessary hardware components, such as processor 910, bus 905, output device 935 (e.g., display), and so forth, to carry out the function.

Figure 9B:
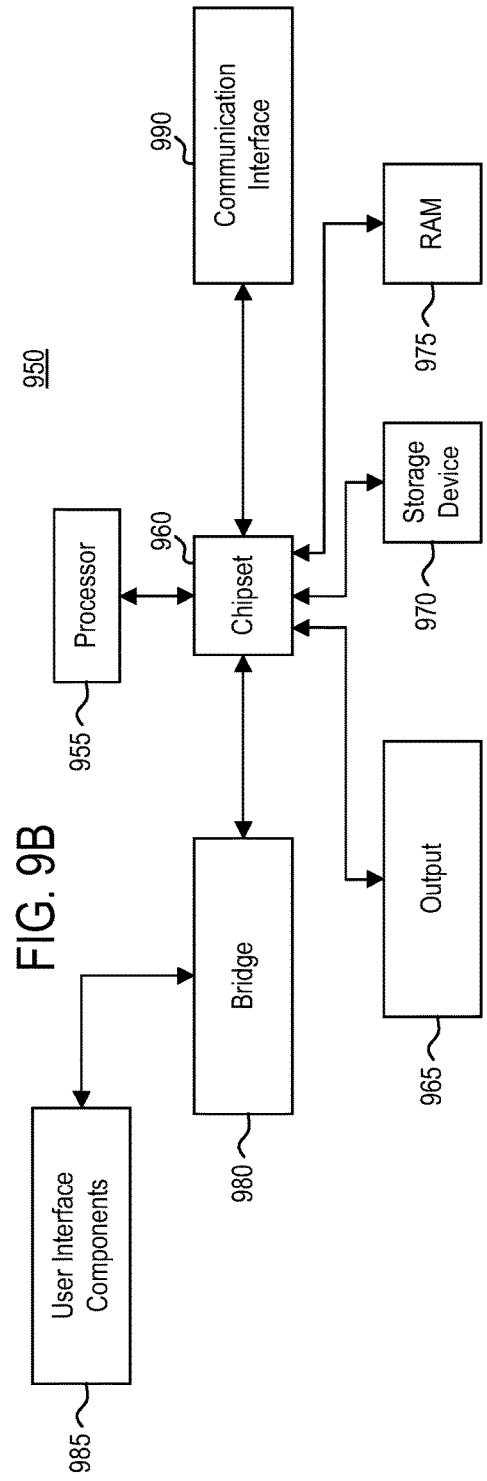
FIG. 9B is a block diagram illustrating a computing device, according to example embodiments.

FIG. 9B illustrates a computer system 950 having a chipset architecture that may represent at least a portion of baseband unit 102 and/or multi-mode head 104. Computer system 950 may be an example of computer hardware, software, and firmware that may be used to implement the disclosed technology. System 950 may include processor 955, representative of any number of physically and/or logically distinct resources capable of executing software, firmware, and hardware configured to perform identified computations. Processor 955 may communicate with a chipset 960 that may control input to and output from processor 955. In this example, chipset 960 outputs information to output 965, such as a display, and may read and write information to storage device 970, which may include magnetic media, and solid state media, for example. Chipset 960 may also read data from and write data to storage device 975 (e.g., RAM). A bridge 980 for interfacing with a variety of user interface components 985 may be provided for interfacing with chipset 960. Such user interface components 985 may include a keyboard, a microphone, touch detection and processing circuitry, a pointing device, such as a mouse, and so on. In general, inputs to system 950 may come from any of a variety of sources, machine generated and/or human generated.

Chipset 960 may also interface with one or more communication interfaces 990 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 955 analyzing data stored in storage device 970 or storage device 975. Further, the machine may receive inputs from a user through user interface components 985 and execute appropriate functions, such as browsing functions by interpreting these inputs using processor 955.

It may be appreciated that example systems 900 and 950 may have more than one processor 910 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A software-defined modem, comprising:
   a multi-mode head, the multi-mode head comprising a plurality of mode frontends, each mode frontend of the plurality of mode frontends to transmit and receive communications according to a preset communication mode, wherein the plurality of mode frontends are controlled by the software-defined modem; and
a baseband unit configured to control operation of the multi-mode head, wherein the multi-mode head is configured to simultaneously use at least two or more communication modes selected from a radio frequency communication mode, an acoustics communication mode, an optical communications mode, and a magnetic induction communication mode.

2. The software-defined modem of claim 1, wherein the multi-mode head further comprises:
a signals unit configured to forward control signals from the baseband unit to the plurality of mode frontends.

3. The software-defined modem of claim 2, wherein the signals unit comprises:
a digital signal processor configured to perform one or more digital signal operations to incoming or outgoing digital signals.

4. The software-defined modem of claim 2, wherein the signals unit comprises:
a conversion module configured to convert an electrical signal to an analog signal and an analog signal to an electrical signal.

5. The software-defined modem of claim 2, wherein the signals unit comprises:
a communication module configured to generate and communicate a control signal to a selected mode frontend of the plurality of mode frontends.

6. The software-defined modem of claim 1, wherein the plurality of mode frontends comprises:
a radio frequency mode frontend configured to communicate in the radio frequency communication mode, the radio frequency mode frontend comprising:
an antenna;
a transmitter/receiver switch in communication with the antenna;
a transmitter in communication with the transmitter/receiver switch, the transmitter configured to provide an outgoing signal to the antenna via the transmitter/receiver switch; and
a receiver in communication with the transmitter/receiver switch, the receiver configured to provide an incoming signal, received through the antenna, to the baseband unit.

7. The software-defined modem of claim 6, wherein the radio frequency mode frontend further comprises:
a plurality of oscillators.

8. The software-defined modem of claim 7, wherein the baseband unit comprises:
a synchronization and timing module configured to generate and provide reference signals to the plurality of mode frontends.

9. The software-defined modem of claim 8, wherein the synchronization and timing module is configured to generate synchronization connections to synchronize the plurality of oscillators of the radio frequency mode frontend.

10. The software-defined modem of claim 1, wherein the plurality of mode frontends comprises:
an acoustic mode frontend configured to communicate in an acoustic communication mode, the acoustic mode frontend comprising:
a transmit transducer configured to transmit an outgoing acoustic signal; and
a transmitter in communication with the transmit transducer, the transmitter configured to provide the outgoing acoustic signal to the transmit transducer; and/or
a receive transducer configured to receive an incoming acoustic signal; and
a receiver in communication with the receive transducer, the receiver configured to receive the incoming acoustic signal, received through the receive transducer, to the baseband unit.

11. The software-defined modem of claim 1, wherein the plurality of mode frontends comprises:
an acoustic mode frontend configured to communicate in an acoustic communication mode, the acoustic mode frontend comprising:
a transmit/receive transducer configured to transmit and/or receive an acoustic signal;
a transmitter/receiver switch in communication with the transmit/receive transducer;
a transmitter in communication with the transmitter/receiver switch, the transmitter configured to provide an outgoing acoustic signal to the transmit/receive transducer via the transmitter/receiver switch; and
a receiver in communication with the transmitter/receiver switch, the receiver configured to receive an incoming acoustic signal, received through the transmit/receive transducer, to the baseband unit.

12. The software-defined modem of claim 1, wherein the plurality of mode frontends comprises:
an optical mode frontend configured to communicate in an optical communication mode, the optical mode frontend comprising:
a light source configured to transmit an outgoing optical signal; and
an optical receiver configured to receive an incoming optical signal.

13. The software-defined modem of claim 1, wherein the plurality of mode frontends comprises:
a magnetic induction mode frontend configured to communicate in the magnetic induction communication mode, the magnetic induction mode frontend comprising:
a magnetic antenna;
a transmitter/receiver switch in communication with the magnetic antenna;
a transmitter in communication with the transmitter/receiver switch, the transmitter configured to provide an outgoing magnetic induction signal to the magnetic antenna via the transmitter/receiver switch; and
a receiver in communication with the transmitter/receiver switch, the receiver configured to provide an incoming magnetic induction signal, received through the magnetic antenna, to the baseband unit.

14. The software-defined modem of claim 1, wherein the baseband unit further comprises:
a digital signal processor configured to implement one or more protocols of the software-defined modem.

15. A software-defined modem, comprising:
a multi-mode head, the multi-mode head comprising:
a first mode frontend configured to transmit and receive communications according to a first communication mode, and
a second mode frontend configured to transmit and receive communications according to a second communication mode;
wherein the first mode frontend and the second mode frontend are controlled by the software-defined modem to transmit and receive communications according to the first communication mode and the second communication mode; and a baseband unit configured to control operation of the multi-mode head, wherein the multi-mode head is configured to simultaneously use the first communication mode and the second communication mode, the baseband unit configured to select one of the first communication mode or the second communication mode for communicating with a node by:

probing the first communication mode and the second communication mode and establishing a first communication link with the node via the first communication mode and a second communication link with the node via the second communication mode, receiving a first set of transmissions via the first communication mode and a second set of transmissions via the second communication mode, determining that the first communication mode results in a lower hardware resource load on the software-defined modem than the second communication mode, and responsive to the determining, sending data to the node using the first communication mode.

16. The software-defined modem of claim 15, wherein determining that the first communication mode results in the lower hardware resource load on the software-defined modem comprises:

determining that the first communication mode has a signal-to-noise ratio threshold with a higher-speed mode priority than the second communication mode.

17. The software-defined modem of claim 15, wherein determining that the first communication mode results in the lower hardware resource load on the software-defined modem comprises:

determining that the first communication mode is more energy efficient, per distance, than the second communication mode.

18. The software-defined modem of claim 15, wherein determining that the first communication mode results in the lower hardware resource load on the software-defined modem comprises:

determining that the first communication mode has a faster transmit time than the second communication mode.

19. The software-defined modem of claim 15, wherein determining that the first communication mode results in the lower hardware resource load on the software-defined modem is based on a function of transmit time and a number of receiver devices capable of receiving a transmission.

20. A method of operating a software-defined modem configured to simultaneously use two or more communication modes, the method comprising:

probing a first communication mode of the software-defined modem and a second communication mode of the software-defined modem;

establishing a first communication link with a target node via a first mode frontend configured to transmit and receive communications according to the first communication mode and a second communication link with the target node via a second mode frontend configured to transmit and receive communications according to the second communication mode;

wherein the first mode frontend and the second mode frontend are controlled by the software-defined modem to transmit and receive communications according to the first communication mode and the second communication mode;

receiving a first set of transmissions via the first communication mode and a second set of transmissions via the second communication mode;

determining that the first communication mode results in a lower hardware resource load on the software-defined modem than the second communication mode; and responsive to the determining, sending data to the target node using the first communication mode.

* * * * *